(12) United States Patent
Lai (10) Patent No.: US 8,127,126 B2
(45) Date of Patent: Feb. 28, 2012

(54) INTEGRATED POWER SUPPLY AND NETWORK CONNECTION CONTROL DEVICE FOR CORD SET

(76) Inventor: Li-Chun Lai, Panciao (TW)

( * ) Notice: Subject to any disclaimer, the term of this patent is extended or adjusted under 35 U.S.C. 154(b) by 359 days.

(21) Appl. No.: 12/574,197

(22) Filed: Oct. 6, 2009

(65) Prior Publication Data

US 2011/0083022 A1 Apr. 7, 2011

(51) Int. Cl.
*G06F 1/26* (2006.01)
*H01R 11/00* (2006.01)
*H01R 13/60* (2006.01)

(52) U.S. Cl. ............... 713/1; 713/2; 439/76.1; 439/505; 439/535; 439/620.1; 439/620.22

(58) Field of Classification Search .................. 713/1, 2; 439/76.1, 505, 535, 620.1, 620.22
See application file for complete search history.

(56) References Cited

U.S. PATENT DOCUMENTS

| 6,817,894 | B2 * | 11/2004 | Sanner et al. | 439/535 |
| 7,367,846 | B1 * | 5/2008 | Yang | 439/638 |
| 7,387,529 | B2 * | 6/2008 | Chan | 439/505 |
| 7,413,471 | B2 * | 8/2008 | Chan | 439/505 |
| 7,955,124 | B2 * | 6/2011 | Su et al. | 439/505 |
| 2003/0054686 | A1 * | 3/2003 | Pappas et al. | 439/535 |
| 2003/0054687 | A1 * | 3/2003 | Sanner et al. | 439/535 |
| 2005/0208825 | A1 * | 9/2005 | Chan | 439/505 |
| 2009/0307506 | A1 * | 12/2009 | He et al. | 713/300 |

* cited by examiner

*Primary Examiner* — M Elamin
(74) *Attorney, Agent, or Firm* — Chun-Ming Shih (57) ABSTRACT

An integrated power supply and network connection control device for a cord set includes a power device having a main outlet and a plurality of auxiliary outlets, the main outlet is kept power-on permanently, and the plurality of auxiliary outlets is controlled to be on/off by a control device; a network connector (RJ45) is disposed on the power device for connecting with a network cable and is also controlled to be on/off by the control device; the control device is coupled with a computer host via a USB cable for a user to set a cursor idle time, a sleep time, a standby time and a shutdown time for the computer host; when the cursor doesn't move for more than the cursor idle time, the control device will force the network connector to turn off the network connection; if the computer host is in a sleep, standby or a shutdown mode, the control device will force the plurality of auxiliary outlets of the power device to be power-off to save energy and to prevent computer hacking.

8 Claims, 9 Drawing Sheets

INTEGRATED POWER SUPPLY AND NETWORK CONNECTION CONTROL DEVICE FOR CORD SET

BACKGROUND OF THE INVENTION

1. Field of the Invention

The present invention relates to an integrated power supply and network connection control device for a cord set, and more particularly, to an integrated power supply and network connection control device which can save energy and prevent computer hacking.

2. Description of the Prior Art

A computer usually comprises a host and a display, and is connected with a plurality of peripheral devices such as a printer, a scanner and a speaker, which all need to be connected with power outlets to be able to operate; therefore, cord sets have become indispensable devices for computers and peripheral devices in operations. Furthermore, when a computer is connected with an Internet service provider via a network cable, it can provide networking functions for users to communicate remotely and to browse the Internet.

Computers have been widely deployed in nearly every household; however, some deficiencies still arise when using computers with peripheral devices and networking functions:

1. Peripheral devices could waste a lot of energy even in their standby modes since they are connected to the cord set and powered continuously; therefore, it is not power-efficient in using the peripheral devices.

2. Computer could provide networking function not only to the users but also to hackers since there could be security breaches, which lead to personal data loss and other problems.

Therefore, the prior art computer techniques present several shortcomings to be overcome.

In view of the deficiencies of the prior art techniques, after years of constant researches, the inventor has successfully proposed an integrated power supply and network connection control device for a cord set.

SUMMARY OF THE INVENTION

It is an object of the present invention to provide an integrated power supply and network connection control device for a cord set, when the cursor doesn't move for a set time, the control device will switch the network connection off to prevent hackers from accessing the computer.

It is another object of the present invention to provide an integrated power supply and network connection control device for a cord set, when the computer is in a sleep, standby or shutdown mode, the control device forces the auxiliary outlet of the power device to be power-off to save energy.

It is still another object of the present invention to provide an integrated power supply and network connection control device for a cord set, the control device can be integrated with the computer host to let a user setup a computer idle time on the computer without implementing a display and an input device (such as a keyboard or a touch screen) on the control device to simplify the circuit structure of the control device.

In order to achieve the above object, the present invention discloses an integrated power supply and network connection control device for a cord set, which mainly comprises a power device, a control device, a USB terminal and a network connector (RJ45); wherein the control device is disposed in the power device; the power device comprises a main outlet and a plurality of auxiliary outlets, the main outlet is kept power-on permanently, and the plurality of auxiliary outlets is controlled by the control device to be power-on/-off, the power device comprises a network connector exposed out of the surface of the power device and connected with the control device, the control device controls the network connector to switch on/off the network connection; the USB terminal is exposed out of the surface of the power device to be connected with the computer host via the USB cable, so as to let a user set up a cursor idle time and a sleep time, a standby time and a shutdown time for the computer host, and store a setup result in the control device, the control device counts the cursor idle time starting from the time the cursor doesn't move, the control device counts the sleep time, the standby time and the shutdown time from the boot time of the computer host; when the control device detects that a set standby/sleep/shutdown time has been reached before the cursor starts moving, the control device switches off the network connection to prevent hackers from accessing the computer. Furthermore, if the set standby/sleep/shutdown time has been reached, the control device will force the auxiliary outlet of the power device to be power-off to save energy.

These features and advantages of the present invention will be fully understood and appreciated from the following detailed description of the accompanying Drawings.

DETAILED DESCRIPTION OF THE PREFERRED EMBODIMENT

Figure 1:
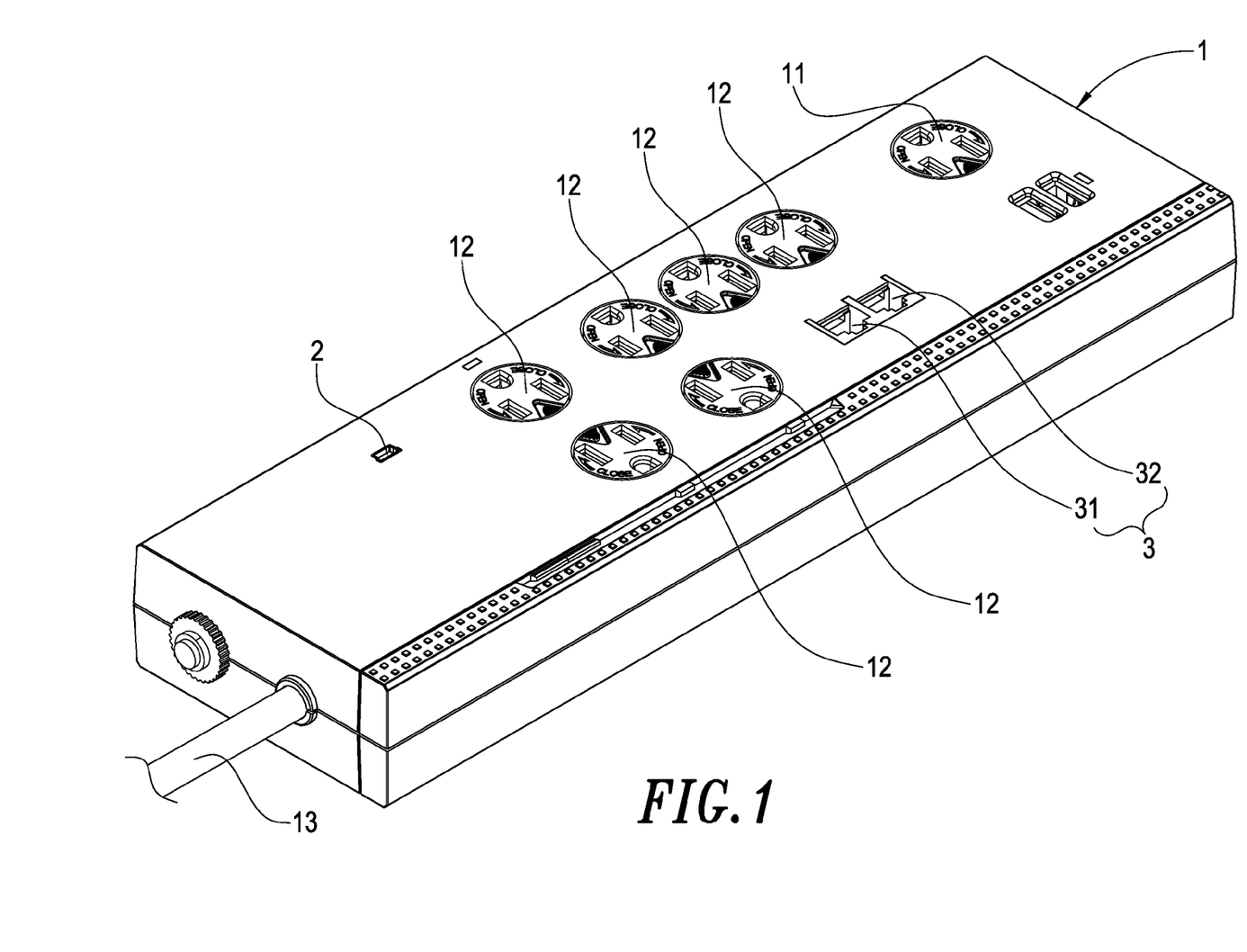
FIG. 1 illustrates a perspective view of an integrated power supply and network connection control device for a cord set in the present invention.
Figure 2:
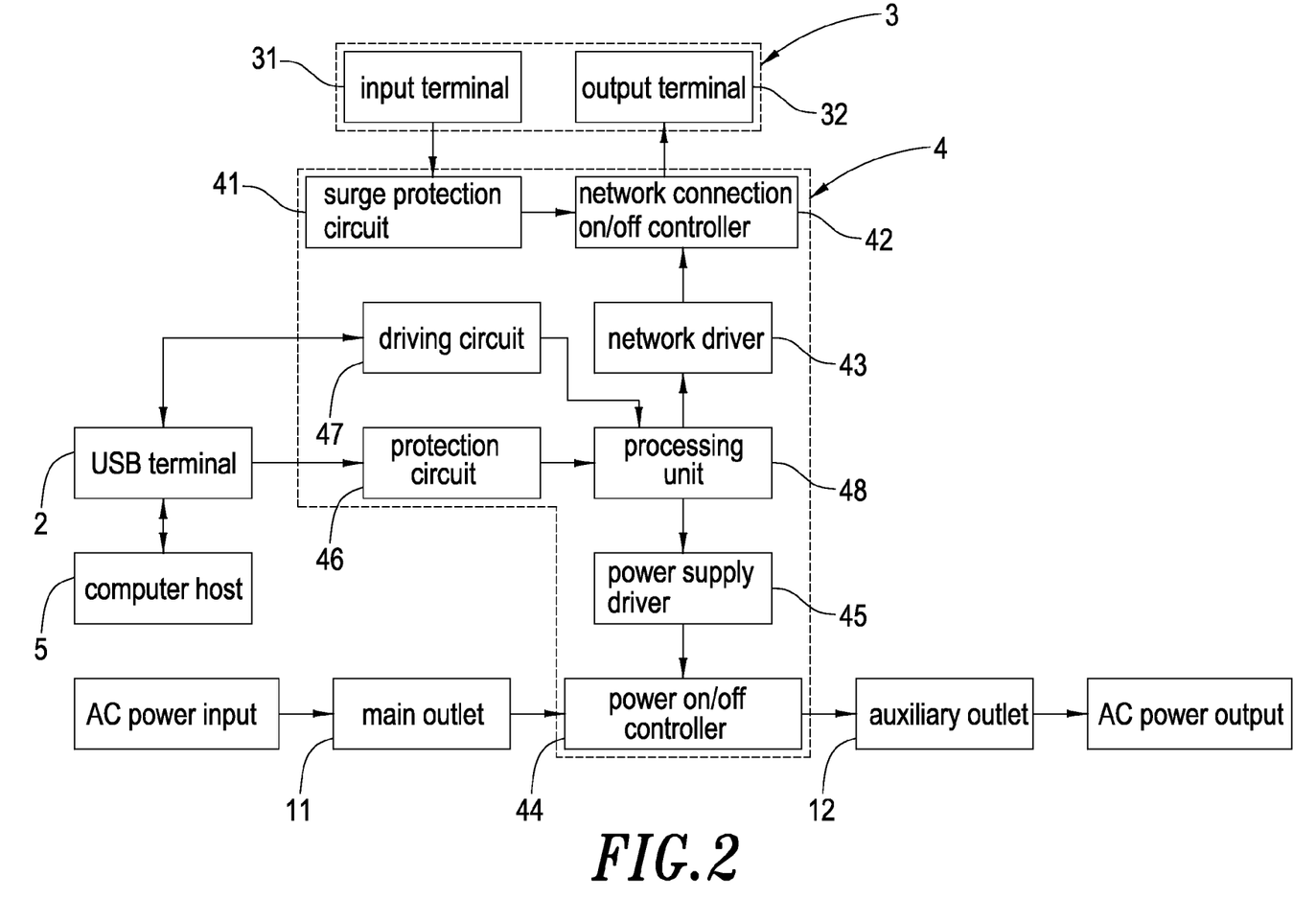
FIG. 2 illustrates a block diagram of the integrated power supply and network connection control device for the cord set in the present invention.
Figure 3A:
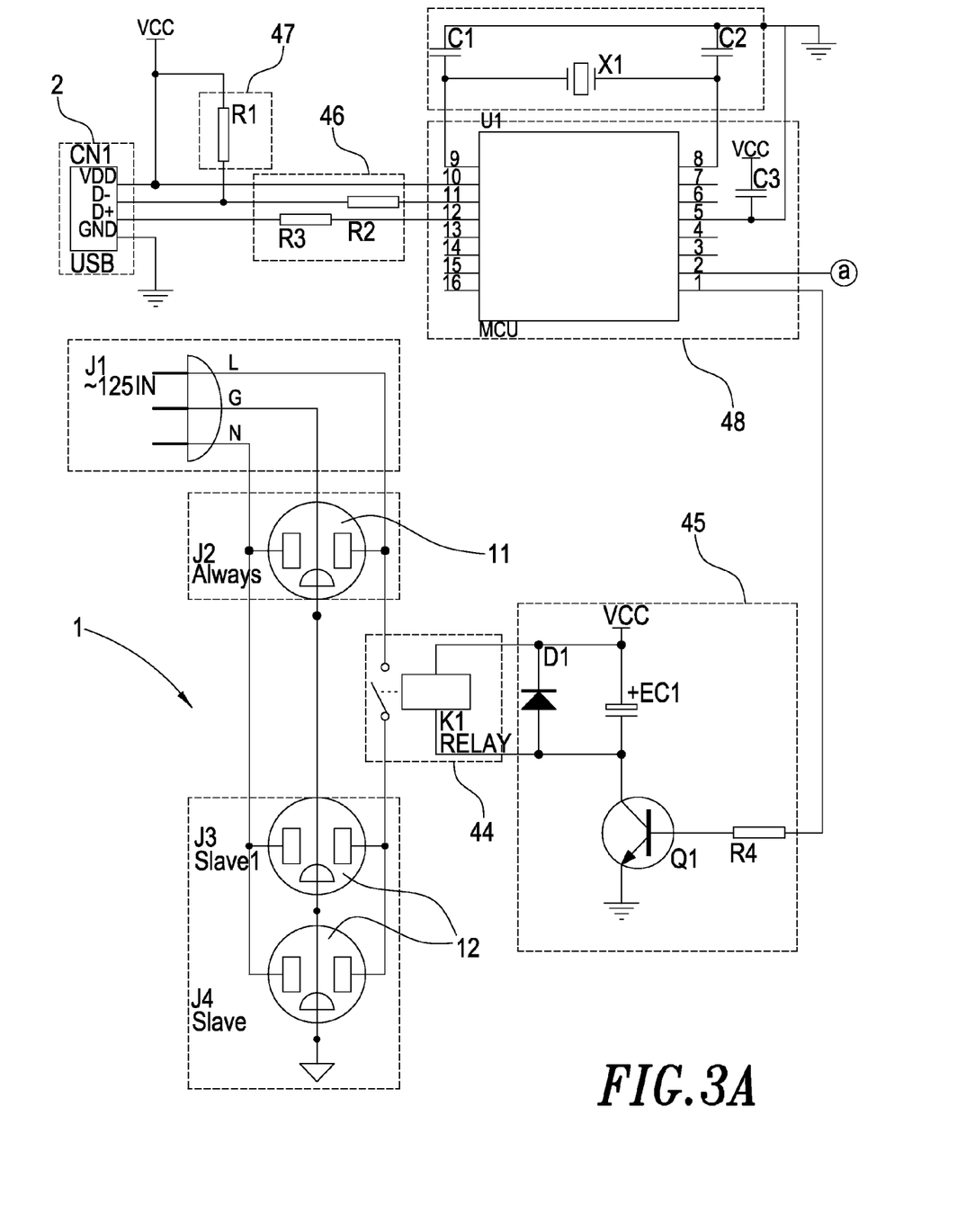
FIG. 3 illustrates a circuit diagram of the integrated power supply and network connection control device for the cord set in the present invention.
Figure 3B:
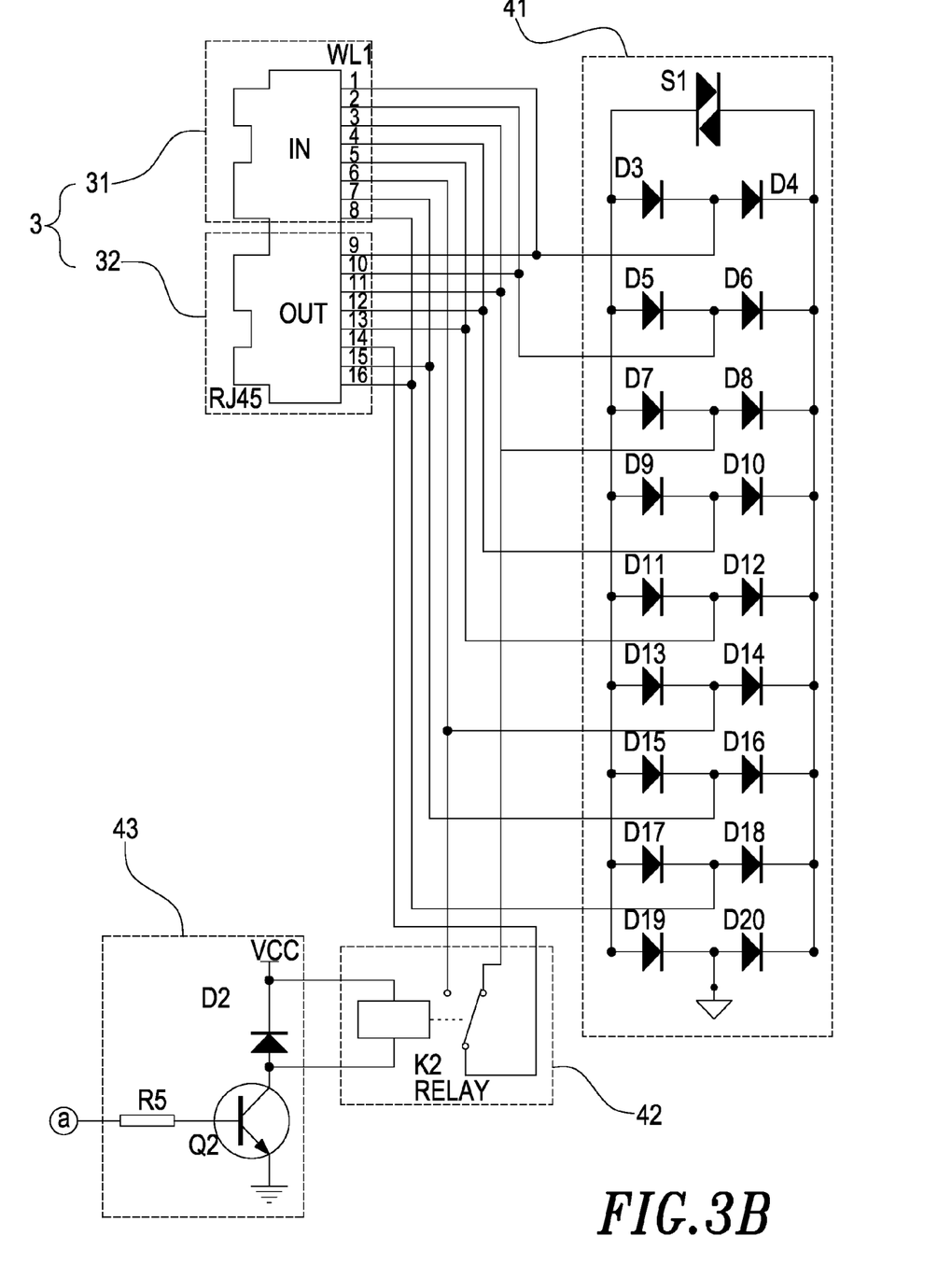

Please refer to FIG. 1 to FIG. 3 for views of an integrated power supply and network connection control device for a cord set in the present invention, which mainly comprises:

a power device 1 disposed with at least one main outlet 11 and a plurality of auxiliary outlets 12, the main outlet 11 is kept power-on permanently, and the power device 1 is connected with a power cord 13;

a USB terminal 2 exposed out of the surface of the power device 1, the USB terminal 2 is connected with a computer host 5 via a USB cable;

a network connector (RJ45) 3, the network connector 3 comprises an input terminal 31 and an output terminal 32, the input terminal 31 and the output terminal 32 is exposed out of the power device 1, the input terminal 31 is connected with a computer host of an Internet service provider via a network cable, and the output terminal 32 is connected with the computer host 5 via another network cable;

a control device 4 disposed in the power device 1, the control device mainly comprises:

a surge protection circuit 41, the surge protection circuit 41 is connected with the input terminal 31 of the network connector 3 to prevent an external current surge from cutting off the network connection;

a network connection on/off controller 42, the network connection on/off controller 42 is connected with the surge protection circuit 41 and the output terminal 32 of the network connector 3 to control the network connection between the input terminal 31 and the output terminal 32 of the network connector 3 to be on or off;

a network driver 43 connected with the network connection on/off controller 42 for controlling the network connection on/off controller 42 to switch the network connection on/off;

a power on/off controller 44 disposed between the main outlet 11 and the auxiliary outlet 12 of the power device 1 to control the power of the main outlet 11 transferred to the auxiliary outlet 12 to switch the power on/off;

a power supply driver 45 connected with the power on/off controller 44 for controlling the power on/off controller 44 to switch the power on/off;

a protection circuit 46, the protection circuit 46 is connected with the USB terminal 2 to prevent the USB terminal signal overload from burning down the control device 4;

a detection circuit 47, the detection circuit 47 is connected with the USB terminal 2 to detect if there's an input signal at the USB terminal 2 and to send a detection result to a processing unit 48;

a processing unit 48, the processing unit 48 is connected with the protection circuit 46, detection circuit 47, power supply driver 45 and the network driver 43, the processing unit 48 receives a signal from the computer host 5 via the detection circuit 47 and the protection circuit 46, the processing unit 48 activates the network driver 43 or the power supply driver 45 according to the signal.

Furthermore, the power on/off controller 44 and the network connection on/off controller 42 can be relays.

Figure 4:
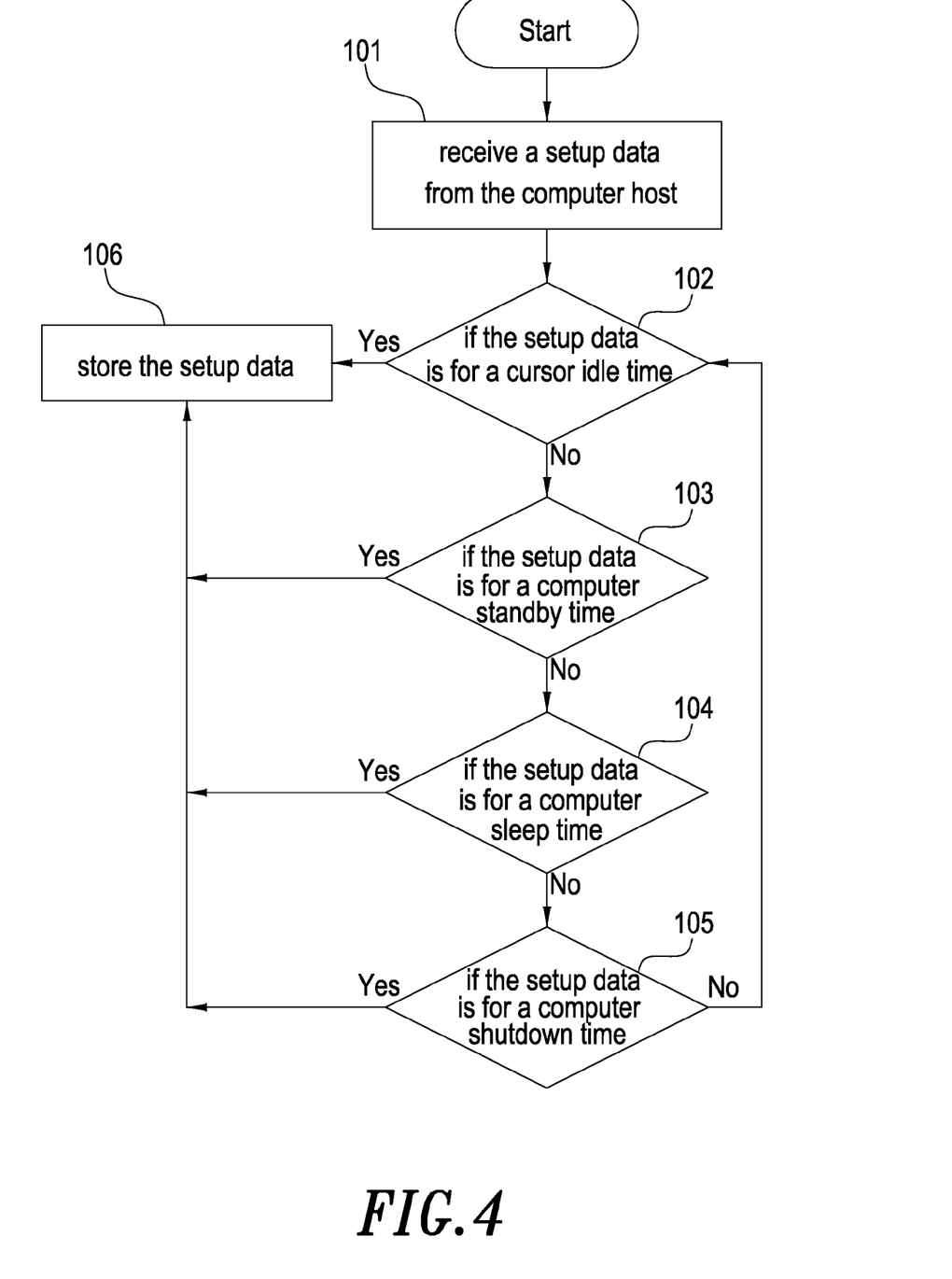
FIG. 4 illustrates a setup flowchart for the integrated power supply and network connection control device for the cord set in the present invention.

Please refer to FIG. 2 and FIG. 4 for the block diagram and a flowchart illustrating the integrated power supply and network connection control device for the cord set in the present invention; wherein the processing unit 48 of the control device 4 is connected with the computer host 5 via a USB cable to let the user execute setup procedures on the display of the computer; when the processing unit receives a setup data from the computer host 101, it determines if the setup data is for a cursor idle time 102, if so, then it stores the setup data 106, if not, then it determines if the setup data is for a computer standby time 103, if so, then it stores the setup data 106, if not, then it determines if the setup data is for a computer sleep time 104, if so, then it stores the setup data 106, if not, then it determines if the setup data is for a computer shutdown time 105, if so, then it stores the setup data 106.

Figure 5:
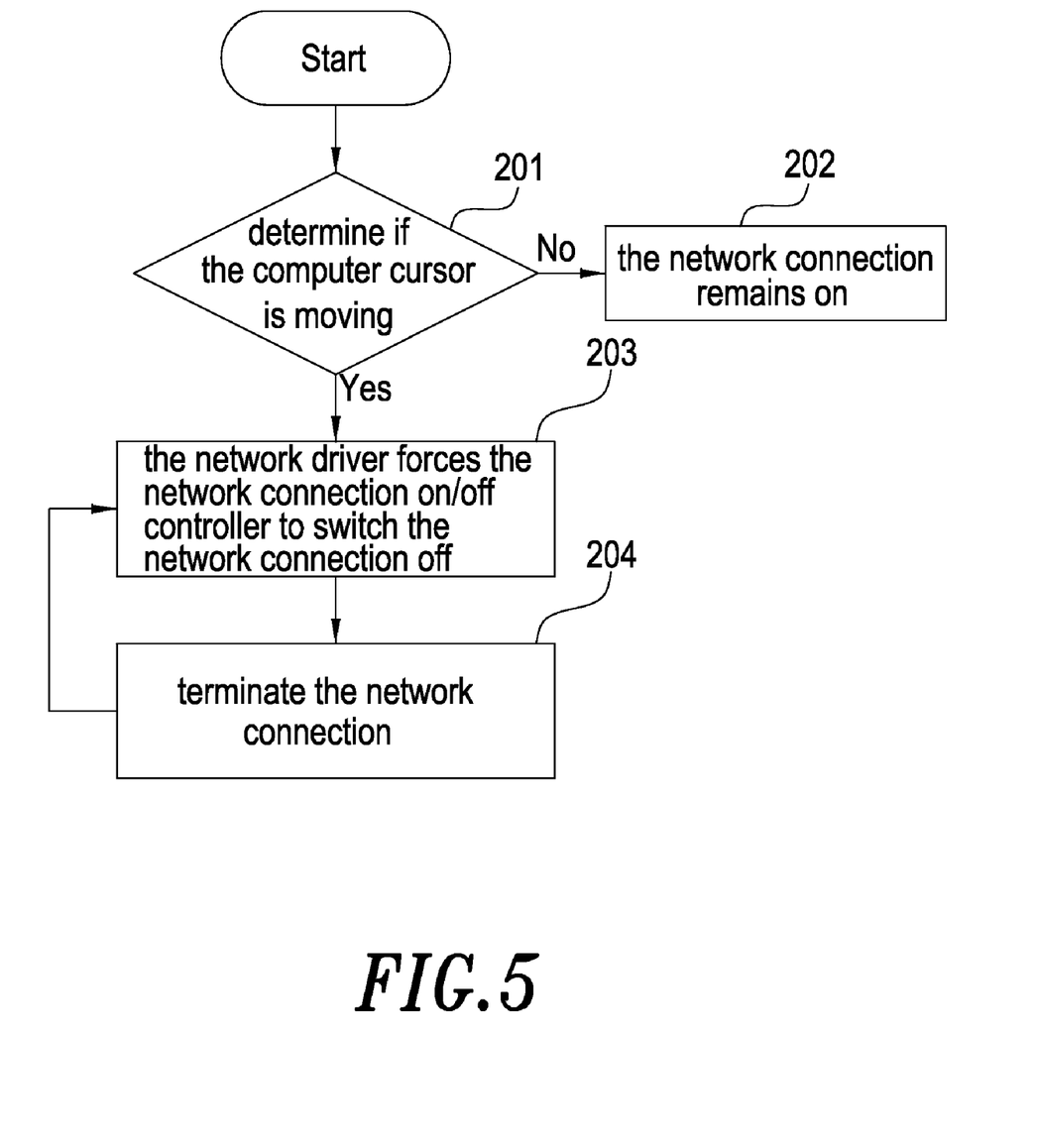
FIG. 5 illustrates a network disconnection flowchart for the integrated power supply and network connection control device for the cord set in the present invention.

Please refer to FIG. 2 and FIG. 5 for the block diagram and a network disconnection flowchart for the integrated power supply and network connection control device for the cord set in the present invention. The processing unit 48 of the control device 4 is connected with the computer host 5 via the USB cable to let the processing unit 48 detect if a signal from the computer host 5 is present at the USB terminal 2 and determine if the computer cursor is moving 201, when the processing unit keeps receiving the signal from the computer host, which means the computer cursor is still moving, then the network connection remains on 202, if no signal is received for a set time, which means the computer cursor does not move for the set time, then the network driver forces the network connection on/off controller to switch the network connection off 203 and to disconnect the input terminal and the output terminal of the network connector to terminate the network connection 204.

When the network connection is off, if the processing unit 48 receives the signal indicating the moving of the computer cursor, then the network driver 43 forces the network connection on/off controller 42 to switch the network connection on to recover the link.

Figure 6:
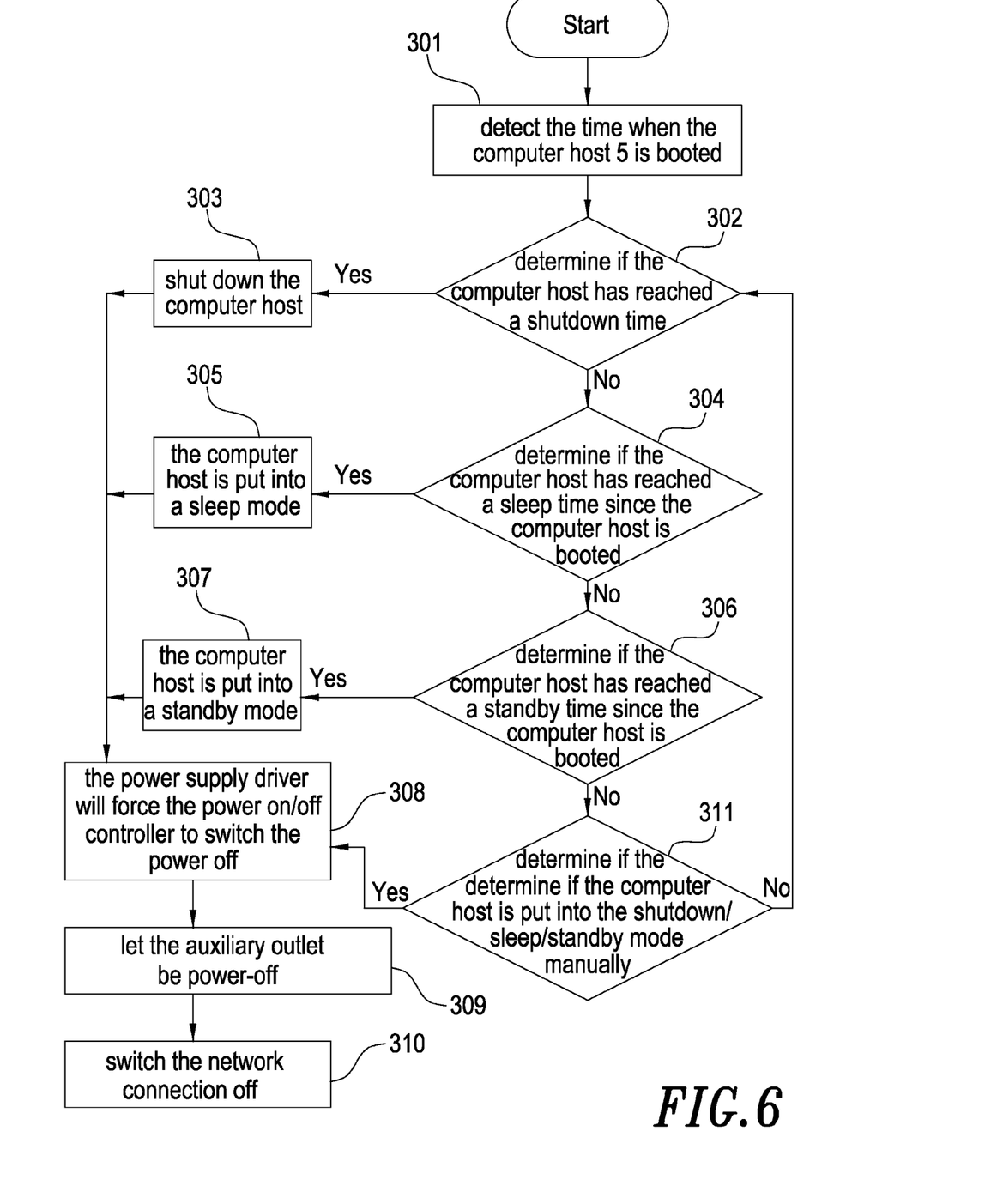
FIG. 6 illustrates a power-off flowchart for an auxiliary outlet of the integrated power supply and network connection control device for the cord set in the present invention.

Please refer to FIG. 2 and FIG. 6 for the block diagram and a power-off flowchart for an auxiliary outlet of the integrated power supply and network connection control device for the cord set in the present invention. The processing unit 48 of the control device 4 is connected with the computer host 5 via the USB cable to let the processing unit 48 use the detection circuit 47 to detect if the computer host 5 is booted 301, and to determine if the computer host has reached a shutdown time 302, if so, then the control device shuts down the computer host 303, if not, then the processing unit 48 determines if the computer host has reached a sleep time since the computer host is booted 304, if so, then the computer host is put into a sleep mode 305, if not, then the processing unit 48 determines if the computer host has reached a standby time since the computer host is booted 306, if so, then the computer host is put into a standby mode 307, if not, then it determines if the computer host is put into the shutdown/sleep/standby mode manually 311, if not then it keeps determining if the computer host is in the shutdown/sleep/standby mod; no matter the computer host is in the shutdown, sleep or the standby mode, the power supply driver will force the power on/off controller to switch the power off 308 to let the main outlet of the power device disconnect with all the auxiliary outlets to let the auxiliary outlet be power-off 309; when the computer host is in the shutdown, sleep or the standby mode, the processing unit cannot receive a signal from the computer host, so it switch the network connection off synchronously 310.

When the auxiliary outlet 12 of power device 1 is power-off, if the computer host 5 reboots or starts again, the processing unit 48 will use the power supply driver 45 to force the power on/off controller 44 to switch the power on and to supply power to the auxiliary outlet 12 of the power device 1, and the processing unit 48 will receive an activation signal from the computer host 5 again to recover the link.

Furthermore, when the control device 4 receives a shutdown, sleep, or a standby signal from the computer host 5, it can delay for a specific time to cut off the power of the auxiliary outlet 12 of the power device 1.

Figure 7:
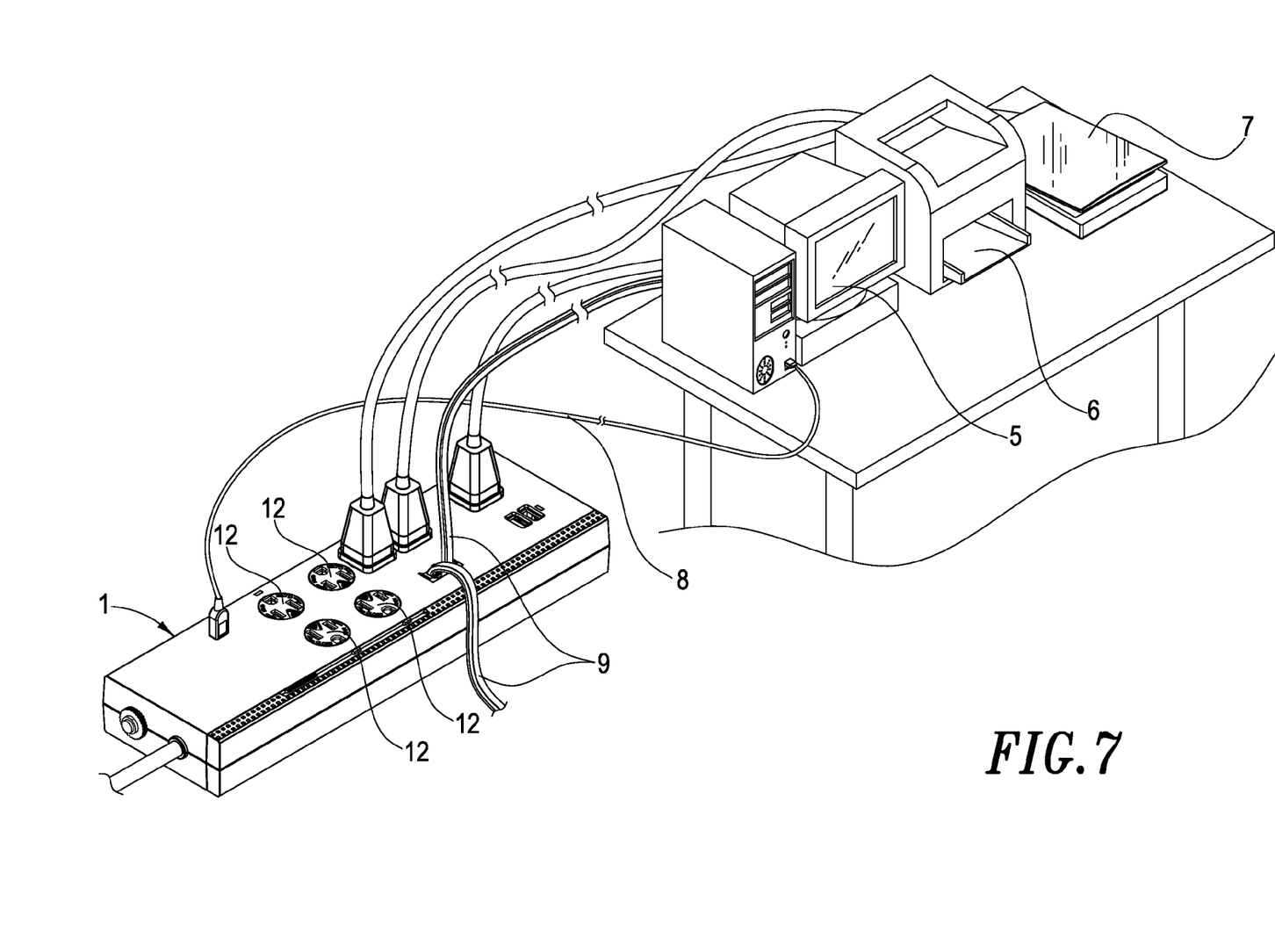
FIG. 7 illustrates a implementation view of the integrated power supply and network connection control device for the cord set in the present invention.

Please refer to FIG. 2 and FIG. 7 for the block diagram and a implementation view of the integrated power supply and network connection control device for the cord set in the present invention. During operation, the power plug of the computer host 5 is inserted on the main outlet 11 of the power device 1; and computer peripheral devices such as a printer 6 or a scanner 7 are inserted on the auxiliary outlet 12 of the power device 1 via power plugs; the USB terminal 2 is connected with the computer host 5 through the USB cable 8 to let the processing unit 48 of the control device 4 to receive a signal from the computer host 5; and the computer host 5 is connected with the output terminal 32 of the network connector 3 via the network cable 9; when the computer host 5 is booted, the control device 4 determines if the computer host has reached a shutdown, sleep, or standby time, if so, the computer host is put into the shutdown, sleep or standby mode, and all the auxiliary outlet 12 of the power device 1 is power-off to disable the printer 6 or the scanner 7 to save energy. If the computer host 5 is in the shutdown, sleep, or standby mode, it will not output any signal to the control device 4, if the control 4 doesn't receive a signal from the computer host for a set time, it will switch the network connection off. Furthermore, when the computer host 5 is booted and the control device 4 doesn't detect the moving of the cursor for a set time, it will also switch the network connection off to prevent hacking.

Figure 8:
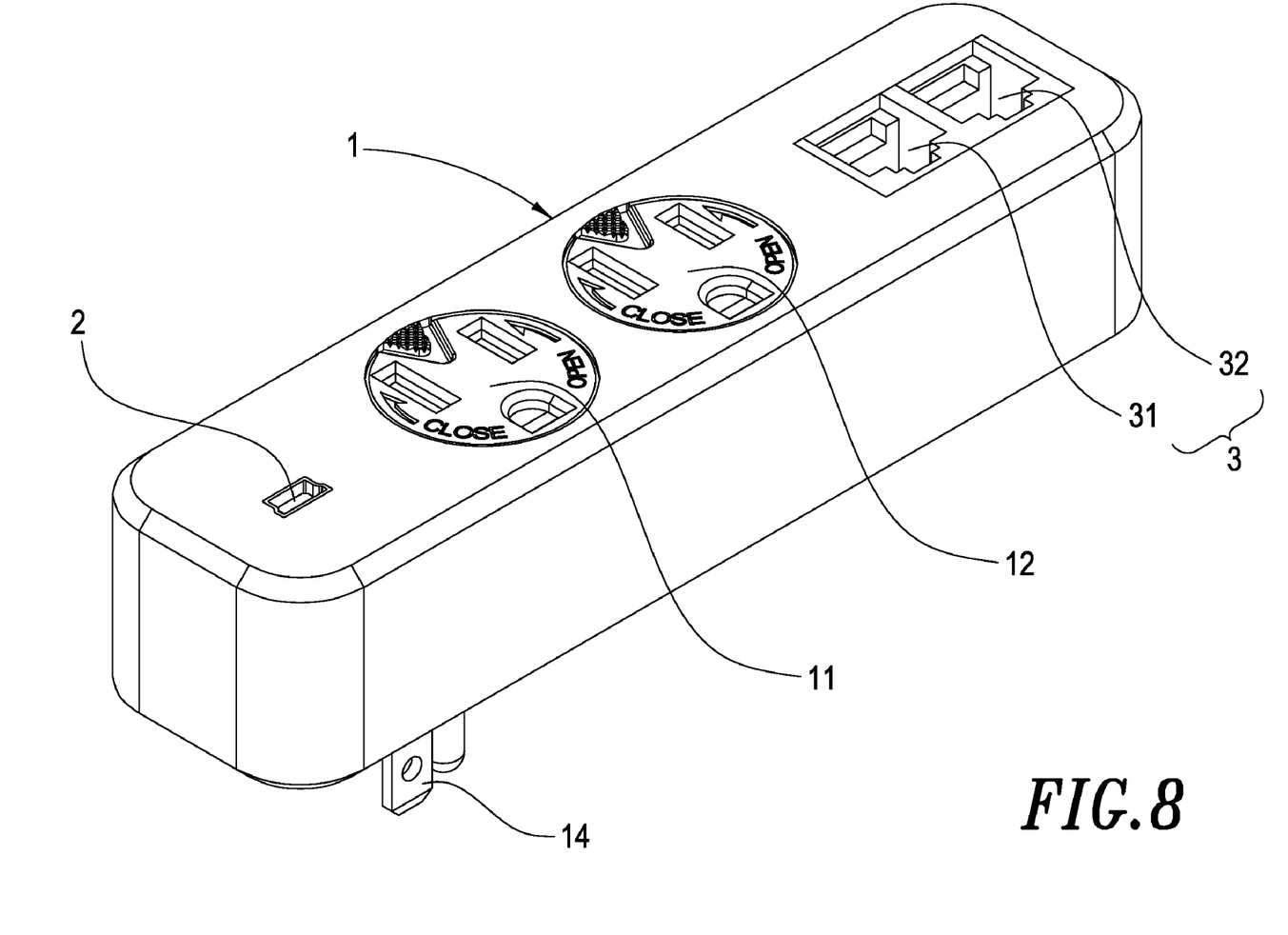
FIG. 8 illustrates another implementation view of the integrated power supply and network connection control device for the cord set in the present invention.

FIG. 8 illustrates another implementation view of the present invention, what is different from the FIG. 1 is that the power device 1 is not disposed with a power cord 13 but a power plug 14, the power plug 14 can be inserted on the outlet, the number of the auxiliary outlets can be no less than one. The other components are the same as those described in FIG. 1 to FIG. 6 and will not be further described.

The present invention discloses an integrated power supply and network connection control device for a cord set, while compared to other prior art techniques, is advantageous in:

1. The present invention provides an integrated power supply and network connection control device for a cord set, when the cursor doesn't move for a set time, the control device will switch the network connection off to prevent hackers from accessing the computer.

2. The present invention provides an integrated power supply and network connection control device for a cord set, when the computer is in a sleep, standby or a shutdown mode, the control device forces the auxiliary outlet of the power device to be power-off to save energy.

3. The present invention provides an integrated power supply and network connection control device for a cord set, the control device can be integrated with the computer host to let a user setup a computer idle time on the computer without implementing a display and an input device (such as a keyboard or a touch screen) on the control device to simplify the circuit structure of the control device.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An integrated power supply and network connection control device for a cord set, comprising:
    a power device disposed with at least one main outlet and no less than one auxiliary outlets, the main outlet being kept power-on permanently, the power device having a USB terminal and a network connector exposed out of a surface of the power device, the network connector comprising an input terminal and an output terminal;
    a control device disposed in the power device, the control device mainly comprising:
    a network connection on/off controller disposed between the input terminal of the network connector and the output terminal of the network connector to control the network connection to be on or off;
    a network driver for controlling the network connection on/off controller to switch the network connection on/off;
    a power on/off controller disposed between the main outlet and the auxiliary outlet of the power device to control the auxiliary outlet to be power-on/-off;
    a power supply driver for controlling the power on/off controller to switch the power on/off;
    a detection circuit, the detection circuit detecting if there's an input signal at the USB terminal and sending a detection result to a processing unit;
    the processing unit receiving a setup signal and an activation signal from a computer host via the USB terminal, and storing the setup signal; when the computer host boots, the processing unit counting the time starting from the boot time of the computer host to detect if a set standby/sleep/shutdown time has been reached, if so, then the power supply driver forcing the power on/off controller to turn off the power of all auxiliary outlets of the power device; and the processing unit receiving the activation signal to determine whether a cursor is activated before the set standby/sleep/shutdown time has been reached, if not, then the processing unit activating the network driver to force the network connection on/off controller to switch the network connection on/off.

2. The integrated power supply and network connection control device for a cord set as claimed in claim 1, wherein the main outlet of the power device is connected with a power plug of the computer host.

3. The integrated power supply and network connection control device for a cord set as claimed in claim 1, wherein the auxiliary outlet of the power device is provided for connecting with a power plug of a computer peripheral device.

4. The integrated power supply and network connection control device for a cord set as claimed in claim 1, wherein the input terminal of the network connector is connected with a computer host of an Internet service provider via a network cable, and the output terminal is connected with the computer host via another network cable.

5. The integrated power supply and network connection control device for a cord set as claimed in claim 1, wherein the control device further comprises a surge protection circuit, and the surge protection circuit is connected with the input terminal of the network connector to prevent an external current surge from cutting off the network connection.

6. The integrated power supply and network connection control device for a cord set as claimed in claim 1, wherein the control device further comprises a protection circuit, and the protection circuit is disposed between the USB terminal and the processing unit to prevent the USB terminal signal overload from burning down the control device.

7. The integrated power supply and network connection control device for a cord set as claimed in claim 1, wherein the USB terminal is connected with the computer host via a USB cable to let the processing unit of the control device to receive a signal from the computer host.

8. The integrated power supply and network connection control device for a cord set as claimed in claim 1, wherein the power on/off controller and the network connection on/off controller of the control device comprise relays.

* * * * *